United States Patent [19]
Masuda

[11] Patent Number: 6,072,609
[45] Date of Patent: Jun. 6, 2000

[54] OPTICAL SIGNAL PROCESSING APPARATUS

[75] Inventor: Hiroshi Masuda, Isehara, Japan

[73] Assignee: Anritsu Corporation, Tokyo, Japan

[21] Appl. No.: 08/824,652

[22] Filed: Mar. 24, 1997

[30] Foreign Application Priority Data

Mar. 28, 1996 [JP] Japan .................................. 8-099190
Mar. 28, 1996 [JP] Japan .................................. 8-099191

[51] Int. Cl.$^7$ .......................... H04B 10/08; H04B 10/06; H04B 10/00
[52] U.S. Cl. .......................... 359/110; 359/190; 359/161; 359/158
[58] Field of Search .................................. 359/110, 158, 359/161, 190, 194

[56] References Cited

U.S. PATENT DOCUMENTS

| | | | |
|---|---|---|---|
| 4,586,186 | 4/1986 | Anderson | ..................................... 375/3 |
| 5,210,712 | 5/1993 | Saito . | |
| 5,535,038 | 7/1996 | Hinch | ..................................... 359/180 |

FOREIGN PATENT DOCUMENTS

| | | |
|---|---|---|
| 6-37556 | 2/1994 | Japan . |
| 6-152578 | 5/1994 | Japan . |

Primary Examiner—Jason Chan
Assistant Examiner—Agustin Bello
Attorney, Agent, or Firm—Frishauf, Holtz, Goodman, Langer & Chick, P.C.

[57] ABSTRACT

A light-receiving circuit converts an optical signal to be processed which is introduced from an optical signal introducing portion, into first and second electrical signals corresponding to the optical signal, and outputs them. The light-receiving circuit includes first and second negative-feedback differential DC amplifying circuits, a photodiode, and a bias power supply circuit. Each of the DC amplifying circuits outputs a voltage proportional to a current flowing through the inverting input terminal from the output terminal. The photodiode has an anode, a cathode, and a light input portion. The anode is directly connected in a DC manner to the inverting input terminal of one of the DC amplifying circuits, and the cathode is directly connected in a DC manner to the inverting input terminal of the other DC amplifying circuit. The photodiode flows from the cathode to the anode a light reception current corresponding to the optical signal to be processed which is input to the light input portion. The bias power supply circuit applies a bias voltage to the non-inverting input terminal of at least one of the first and second DC amplifying circuits so as to set the potential of the cathode of the photodiode higher than that of the anode.

21 Claims, 8 Drawing Sheets

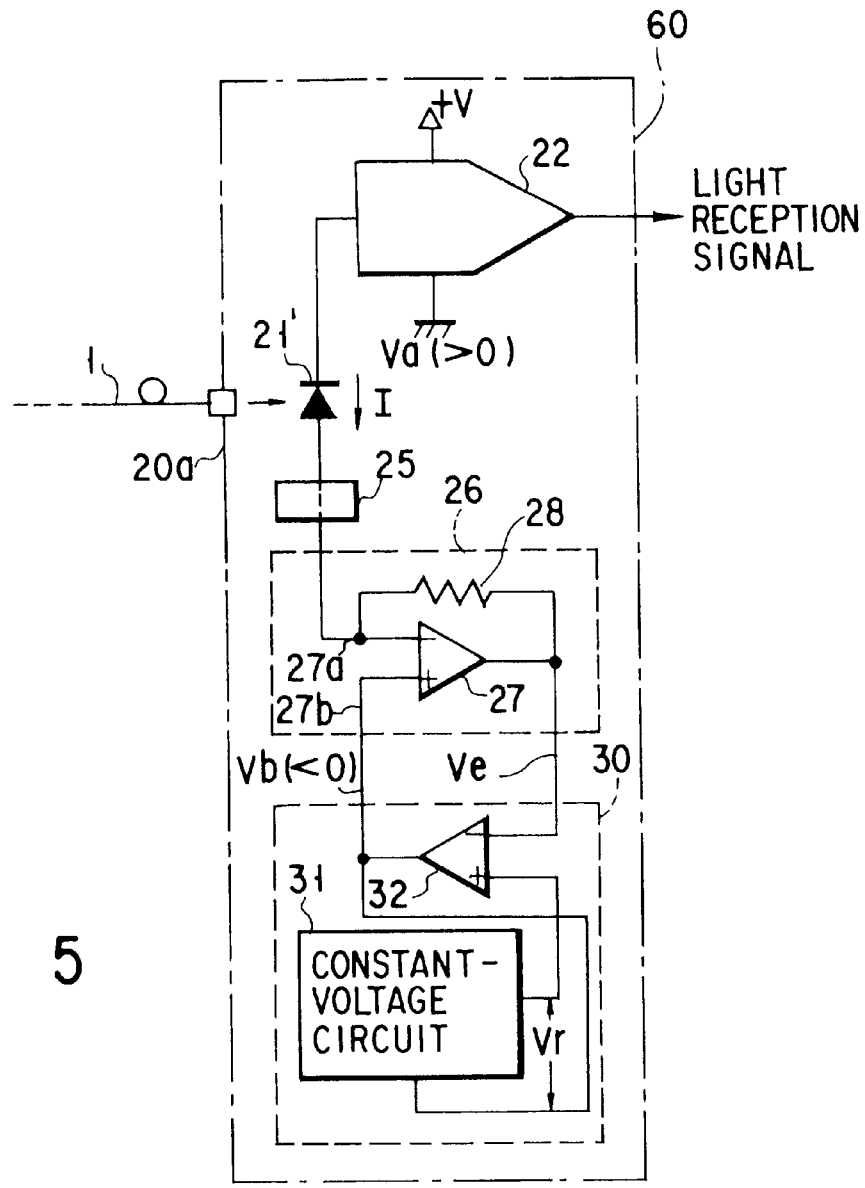
F I G. 5
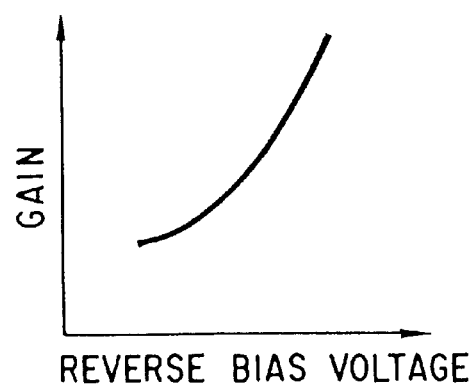
F I G. 6

OPTICAL SIGNAL PROCESSING APPARATUS

BACKGROUND OF THE INVENTION

The present invention relates to an optical signal processing apparatus and, more particularly, to an optical signal processing apparatus including a light-receiving circuit which receives and processes a high-speed digitally modulated optical signal used in an optical communication system or the like, an optical signal processing apparatus including the light-receiving circuit and a band limiting circuit which limits the band of a digital signal processed by the light-receiving circuit, and an optical signal processing apparatus including the light-receiving circuit and an error measuring circuit which measures an error of an original high-speed digitally modulated optical signal on the basis of an output from the light-receiving circuit or the band limiting circuit.

When, e.g., an error of the above-described high-speed digitally modulated optical signal used in the optical communication system or the like is to be measured, the correlation between the intensity of input light and the error rate must be examined.

For this purpose, an optical signal error measuring circuit having an arrangement as shown in FIG. 13 has conventionally been used.

More specifically, an optical fiber 1 for transmitting a target measurement optical signal is connected to a light-receiving circuit 2 including a photodiode 2a.

A light reception signal from the photodiode 2a is output to an error measuring device 3 to measure an error of the optical signal.

Then, the connection of the optical fiber 1 is changed from the light-receiving circuit 2 to an optical power meter 4 including a photodiode 4a.

The intensity of the optical signal is measured by a light reception signal from the photodiode 4a.

In an arrangement shown in FIG. 14, an optical signal output from an optical fiber 1 is branched by a photo coupler 5. Then, one branched signal is input to an error measuring device 3 through a light-receiving circuit 2 including a photodiode 2a, and the other is input to an optical power meter 4 including a photodiode 4a. The error rate and intensity of the optical signal are simultaneously measured on the respective paths.

In, however, the method of performing measurement upon changing the connection of the optical fiber 1, as shown in FIG. 13, the connection state of the optical fiber 1 undesirably varies, resulting in inaccurate measurement.

In the method of branching the optical signal from the optical fiber 1 by the photo coupler 5, as shown in FIG. 14, the intensities of light input to the light-receiving circuit 2 and the optical power meter 4 greatly decrease upon branching, decreasing the S/N. As a result, an optical signal with a low intensity cannot be accurately measured.

Either method described above requires two light-receiving circuits, resulting in a high-cost measuring system as a whole.

To solve these problems, it can be considered to amplify a light reception signal from one photodiode, and branch the amplified output to two systems.

This method however requires a very-high-cost amplifying circuit which has high-speed response characteristics corresponding to a high-speed digitally modulated signal, and a wide dynamic range enough to allow measurement of power in a wide input range.

Jpn. Pat. Appln. KOKAI Publication No. 6-37556 discloses a prior art of detecting two branched signals by using the two terminals, i.e., anode and cathode of one photodiode.

In this prior art, load resistors are respectively connected to the anode and cathode of the photodiode to reverse-bias the photodiode.

In this case, however, a voltage drop caused by the load resistor becomes large for a received optical signal having a large magnitude. As a result, the voltage across the two terminals of the photodiode decreases to degrade the response characteristics.

Further in this prior art, it is basically impossible to couple the photodiode to a DC amplifier in a DC manner to apply a reverse bias. A DC-cut capacitor must be inserted.

This fact is derived from the fact that DC amplification is impossible.

That is, this prior art has a problem that a response from a DC component is impossible because the DC component of an input to the DC amplifier must be cut.

On the other hand, in the optical communication system as described above, high-speed digital signals of 52 Mbps, 156 Mbps, and 622 Mbps are used in a transmission system for transmitting high-speed digitally modulated signals as multiplexed optical signals.

In general, in an optical signal error measuring device which receives and processes such a digital signal from the light-receiving circuit as described above, amplifying devices each having a band limited for a corresponding bit rate are selectively used in accordance with the bit rate of an input digital signal.

The use of the amplifying devices independent for the respective bit rates as described above complicates the arrangement of the whole measuring system, resulting in an increase in mounting area. The whole measuring system cannot be downsized.

To solve this problem, it can be considered that band limiting filters corresponding to respective bit rates are arranged to be selectively connected to a signal path in one amplifying device by using a relay switch or a diode switch, thereby switching the band in accordance with the bit rate of an input digital signal.

This method however requires, on the input and output sides, a plurality of filter circuits independent for the respective bit rates, and relay switches for switching these filter circuits. The apparatus cannot be sufficiently downsized, and the reliability is degraded by the use of the relay switches.

In a method of selectively connecting a signal path and each filter by a diode switch in place of the relay switch, a digital signal is distorted by the nonlinearity of the diode.

BRIEF SUMMARY OF THE INVENTION

It is an object of the present invention to solve the problems of the conventional light-receiving circuit described above, and to provide an optical signal processing apparatus including a low-cost light-receiving circuit with excellent response characteristics which can obtain wide-band characteristic in a wide dynamic range even with an arrangement using one photodiode, and can branch the light reception signal into two systems and simultaneously output them.

It is another object of the present invention to solve the problems of the above-described band-limited amplifying device, and to provide an optical signal processing apparatus including a new, improved light-receiving circuit, and a compact digital signal band limiting circuit which can limit the bands of digital signals at different bit rates output from the light-receiving circuit without degrading the reliability and causing distortion.

It is still another object of the present invention to solve the problems of the conventional light-receiving circuit and band-limited amplifying device described above, and to provide an optical signal processing apparatus including a new, improved light-receiving circuit, a digital signal band limiting circuit, and a low-cost error measuring device capable of accurately measuring an error of an optical signal.

According to a first aspect of the present invention, there is provided an optical signal processing apparatus comprising: an optical signal introducing portion for introducing an optical signal to be processed; and a light-receiving circuit for converting the optical signal to be processed which is introduced from the optical signal introducing portion, into first and second electrical signals corresponding to the optical signal, and outputting the first and second electrical signals, the light-receiving circuit comprising: a) first and second negative-feedback differential DC amplifying circuits each of which has an inverting input terminal, a non-inverting input terminal, and an output terminal, and outputs from the output terminal a voltage proportional to a current flowing through the inverting input terminal; b) a photodiode having an anode, a cathode, and a light input portion, the anode being directly connected in a DC manner to the inverting input terminal of one DC amplifying circuit of the first and second DC amplifying circuits, the cathode being directly connected in a DC manner to the inverting input terminal of the other DC amplifying circuit, and the photodiode flowing from the anode to the cathode a light reception current corresponding to the optical signal to be processed which is input to the light input portion; and c) a bias power supply circuit for applying a bias voltage to the non-inverting input terminal of at least one DC amplifying circuit of the first and second DC amplifying circuits so as to set a potential of the cathode of the photodiode higher than a potential of the anode, wherein the first and second electrical signals corresponding to the optical signal to be processed are output from the respective output terminals of the first and second DC amplifying circuits.

According to a second aspect of the present invention, there is provided an optical signal processing apparatus comprising: an optical signal introducing portion for introducing high-speed digitally modulated optical signals having different bit rates; a light-receiving circuit for converting an optical signal to be processed which is introduced from the optical signal introducing portion, into a digital signal as a main signal corresponding to the optical signal and an electrical signal as an auxiliary signal, and outputting the digital signal and the electrical signal; and a digital signal band limiting circuit for limiting the digital signal output from the light-receiving circuit to have a band matching with a bit rate of the digital signal, the digital signal band limiting circuit comprising: a coil connected in series with an output path of the digital signal; a plurality of capacitors arranged between at least one terminal of the coil and a reference potential point; a PIN diode connected between at least one of the plurality of capacitors and the reference potential point; and a band switching circuit which selectively flows a current to the PIN diode in accordance with the bit rate of the digital signal to switch the PIN diode from an OFF state to an ON state, thereby changing stepwise a capacitance between at least one terminal of the coil and the reference potential point in accordance with the bit rate of the digital signal.

According to a third aspect of the present invention, there is provided an optical signal processing apparatus comprising: an optical signal introducing portion for introducing an optical signal to be processed; a light-receiving circuit for converting the optical signal to be processed which is introduced from the optical signal introducing portion, into a main signal for measuring an error rate, and an auxiliary signal for measuring optical power, and outputting the main signal and the auxiliary signal; optical power measuring means for measuring optical power of the optical signal to be processed on the basis of the auxiliary signal for measuring optical power which is output from the light-receiving circuit; error rate measuring means for measuring an error rate of the optical signal to be processed on the basis of the main signal for measuring an error rate which is output from the light-receiving circuit, and a clock signal included in the main signal; and data analyzing means for performing, on the basis of optical power measurement data from the optical power measuring means and error rate measurement data from the error rate measuring means, a correlation analysis of the two data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a block diagram showing the circuit arrangement of the main part of still another modification of first embodiment according to the present invention;

FIG. 6 is a graph showing change characteristics of the reverse bias voltage vs. the gain of an avalanche photodiode used in the present invention;

DETAILED DESCRIPTION OF THE INVENTION

Figure 1:
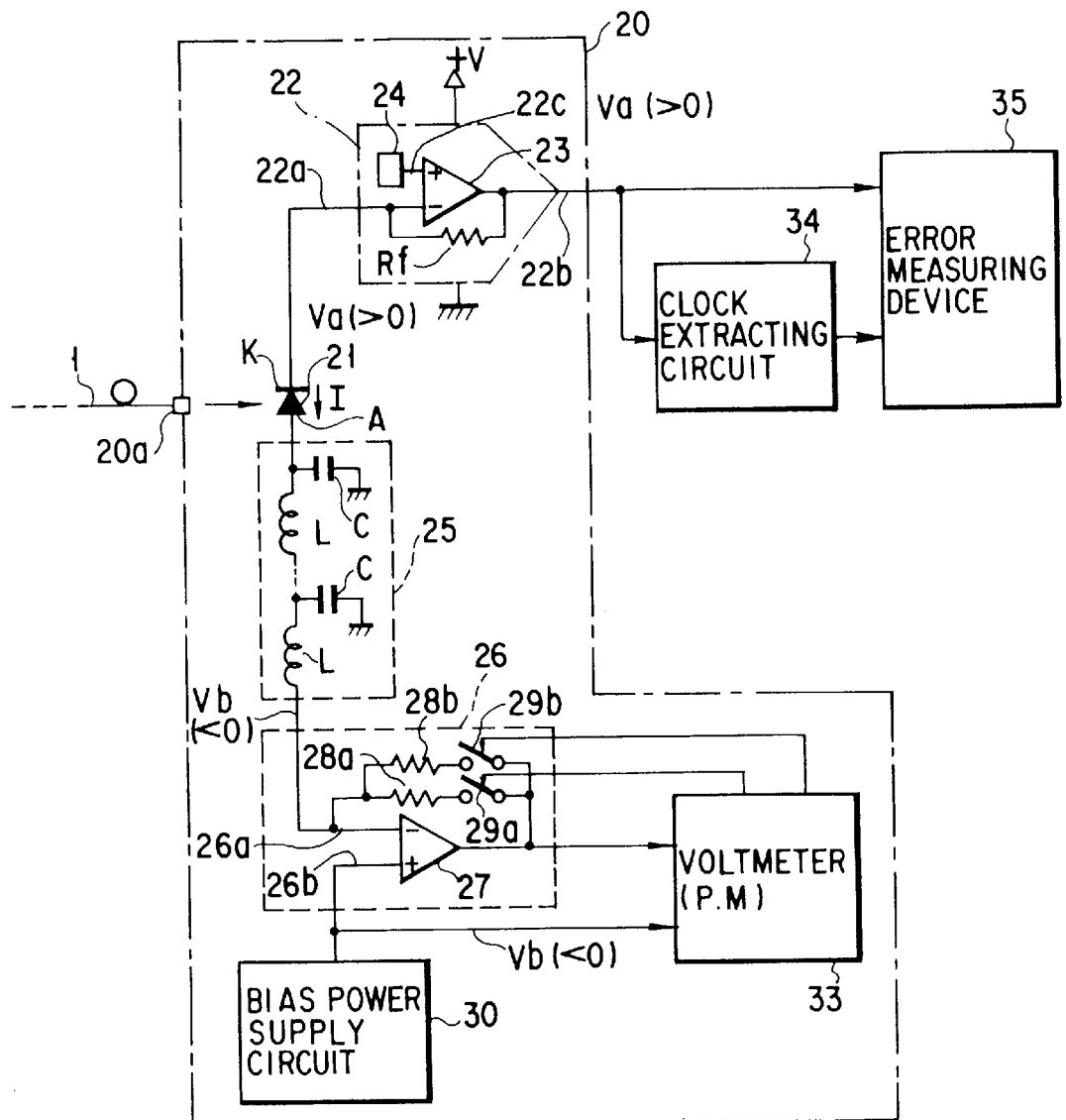
FIG. 1 is a block diagram showing the circuit arrangement of the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the several views of the drawing.

FIG. 1 shows an optical signal processing circuit comprising a light-receiving circuit 20, a clock extracting circuit 34, an error measuring device 35, a data analyzer 36, and a display 37 according to the first embodiment of the present invention.

Of these components, the light-receiving circuit 20 receives a high-speed digitally modulated optical signal through an optical fiber 1, converts it into an electrical signal, and outputs a digital signal and an intensity signal in order to simultaneously measure the error and intensity of the optical signal having undergone high-speed digital modulation by the above-described optical communication system or the like. In addition, the light-receiving circuit 20 has a function of instructing the intensity of the optical signal.

More specifically, light input through the optical fiber 1 is input to a photodiode 21 through a fiber connector 20a and a focusing optical system (not shown). The photodiode 21 is constituted by a high-speed-response PIN photodiode or an avalanche photodiode. The photodiode 21 flows a light reception current I corresponding to the input optical signal from a cathode K to an anode A.

The cathode K of the photodiode 21 is directly connected to an inverting input terminal 22a of a first DC amplifying circuit 22 with wideband characteristics of amplifying the light reception current I flowing through the photodiode 21.

The first DC amplifying circuit 22 is constituted by a current-sweep out transimpedance amplifier having one inverting input terminal 22a, one non-inverting input terminal 22c, and one output terminal 22b.

The interior of the transimpedance amplifier of the first DC amplifying circuit 22 is constituted by a negative-feedback differential amplifying circuit 23 which is connected to a feedback resistor Rf on the inverting input side as the input terminal 22a side, and a bias power supply circuit 24 for applying a predetermined positive bias voltage Va to the non-inverting input terminal 22c side of the negative-feedback differential amplifying circuit 23. The transimpedance amplifier amplifies and outputs a voltage proportional to the current flowing from the inverting input terminal 22a, to the output terminal 22b.

The voltage of the inverting input terminal 22a side of the negative-feedback differential amplifying circuit 23 is made equal to the voltage to be applied to the non-inverting input terminal 22c side.

The voltage of the inverting input terminal 22a of the first DC amplifying circuit 22 is therefore equal to the voltage Va of the internal bias power supply circuit 24.

In this case, when the power supply voltage +V of the first DC amplifying circuit 22 is 5V, a bias voltage of about +1V is applied to the inverting input terminal 22a.

The anode A of the photodiode 21 is connected to an inverting input terminal 26a of a second DC amplifying circuit 26 through a filter circuit (LPF) 25.

The filter circuit 25 is constituted by connecting capacitor-input low-pass filters each consisting of a parallel capacitor C and a series coil L in many stages (it is also possible to connect them in one stage). The filter circuit 25 outputs a DC component of the light reception current of the photodiode 21 to the second DC amplifying circuit 26.

The second DC amplifying circuit 26 is constituted to be of a negative-feedback differential type by an operational amplifier 27, a plurality of feedback resistors 28a, 28b, . . . (two are shown in FIG. 1) having one-terminal sides connected parallel to the inverting input terminal 26a of the operational amplifier 27, and range switches 29a and 29b for selectively connecting the other-terminal sides of the plurality of feedback resistors 28a, 28b, . . . and an output terminal 27c of the operational amplifier 27.

The operational amplifier 27 amplifies and outputs from the output terminal 27c the voltage proportional to the current flowing through the inverting input terminal 26a of the operational amplifier 27.

Note that positive and negative power supply voltages (not shown) are applied to the operational amplifier 27.

A negative bias voltage Vb is applied from a bias power supply circuit 30 to a non-inverting input terminal 26b of the operational amplifier 27.

For this reason, the input terminal (inverting input terminal 26a) of the second DC amplifying circuit 26 has the same potential as that of the bias voltage Vb.

The bias power supply circuit 30 generates the voltage Vb from the negative power supply connected to the operational amplifier 27.

A positive voltage Va is therefore applied from the input terminal 22a of the first DC amplifying circuit 22 to the cathode K of the photodiode 21.

A negative voltage Vb is applied from the inverting input terminal 26a of the operational amplifier 27 of the second DC amplifying circuit 26 to the anode A of the photodiode.

With these voltages, the photodiode 21 is reverse-biased by a voltage (Va–Vb).

This reverse biasing greatly decreases the capacitance between the depletion layers in the photodiode 21. The photodiode 21 can flow the light reception current I corresponding to very-high-speed digitally modulated light.

The first DC amplifying circuit 22 converts the light reception current I from the photodiode 21 into a voltage, which is amplified and output.

This amplified signal is input to the error measuring device 35 (see, e.g., FIG. 22 and its description in U.S. Pat. No. 5,210,712), together with a clock signal extracted from the amplified signal from the first DC amplifying circuit 22 by the well-known clock extracting circuit 34 (see, e.g., FIG. 7 and its description in Jpn. Pat. Appln. KOKAI Publication No. 6-152578). Then, an error is measured.

The second DC amplifying circuit 26 converts a DC component of the light reception current I from the photodiode 21 into a voltage, which is amplified and output.

This amplified signal output from the second DC amplifying circuit 26 is input to a voltmeter 33 serving as an optical power meter (P.M), together with an output from the bias power supply circuit 30.

The voltmeter 33 serving as an optical power meter (P.M) instructs the optical power of an original optical signal in correspondence with the level of the amplified signal for the bias voltage Vb.

The voltmeter 33 supplies switch control signals to the switches 29a and 29b for switching the feedback resistors 28a and 28b of the operational amplifier 27 in order to adjust the level of the amplified signal within a predetermined instructed range.

According to a method of applying a reverse bias to the photodiode 21 of the light-receiving circuit 20, the photodiode 21 is applied with bias voltages applied to the respective non-inverting input terminals 22c and 26b of the first and second DC amplifying circuits 22 and 26 directly connected in a DC manner on the non-inverting input terminal sides to the anode A and cathode K of the photodiode 21.

Figure 2:
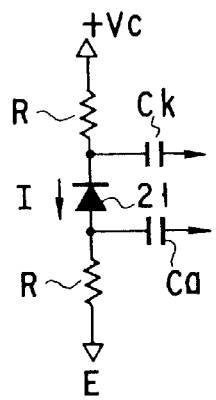
FIG. 2 is a circuit diagram showing a circuit arrangement for reverse-biasing a photodiode through a load resistor in a prior art.

This reverse bias applying method has higher performance than that of a conventional method of applying independent reverse bias power supply voltages Vc and E to the photodiode 21 through load resistors R, as shown in FIG. 2.

More specifically, the reverse bias applying circuit shown in FIG. 2 is equivalent to the one disclosed as an actual circuit in FIG. 6(b) of Jpn. Pat. Appln. KOKAI Publication No. 6-37556. The reverse bias voltage of the photodiode 21 is decreased by a voltage drop caused by the flow of the light reception current I from the photodiode to the load resistors R. If strong light is input, the high-frequency response characteristics of the photodiode are degraded.

To the contrary, in the light-receiving circuit 20 of the present invention shown in FIG. 1, a reverse bias is applied to the photodiode without the mediacy of any load resistor by utilizing the fact that the inverting input terminal of the negative-feedback differential DC amplifying circuit has the same potential as the potential to be applied to the non-inverting input terminal side.

The light-receiving circuit 20 of the present invention can therefore effectively use the wideband response characteristics of the photodiode itself without being affected by variations in intensity of input light.

In the light-receiving circuit 20 of the present invention shown in FIG. 1, the two terminals of the photodiode are reverse-biased by voltages at the input operation points of the respective DC amplifying circuits. Even if the input terminals of the respective amplifying circuits are directly connected to the photodiode in a DC manner, the operations of the amplifying circuits themselves are free from any influence.

The light-receiving circuit 20 need not cut off DC components at capacitors Ca and Ck, and can perform DC amplification, unlike in the conventional reverse bias applying circuit shown in FIG. 2.

In the light-receiving circuit 20 shown in FIG. 1, the cathode K of the photodiode 21 is connected to the first DC amplifying circuit 22 constituted by the current-discharge transimpedance amplifier, and the anode A is connected to the second DC amplifying circuit 26 constituted by the operational amplifier 27. With this arrangement, a reverse bias voltage is applied to the photodiode 21.

Instead of this arrangement, however, it is also possible that the polarity of the photodiode 21 is inverted, the first DC amplifying circuit 22 is constituted by a current-pumping transimpedance amplifier, and a positive voltage higher than the voltage of a bias power supply in the transimpedance amplifier is applied from the bias power supply circuit 30 to the non-inverting input terminal of the operational amplifier 27 of the second DC amplifying circuit 26 to apply a reverse bias voltage to the photodiode 21.

The first embodiment employs as the first DC amplifying circuit the transimpedance amplifier which incorporates a bias power supply and can obtain high-speed response characteristics. Alternatively, like a light-receiving circuit 40 shown in FIG. 3, a first DC amplifying circuit 22' may be constituted by the operational amplifier 27 and a feedback resistor 28, similar to the second DC amplifying circuit 26.

Figure 3:
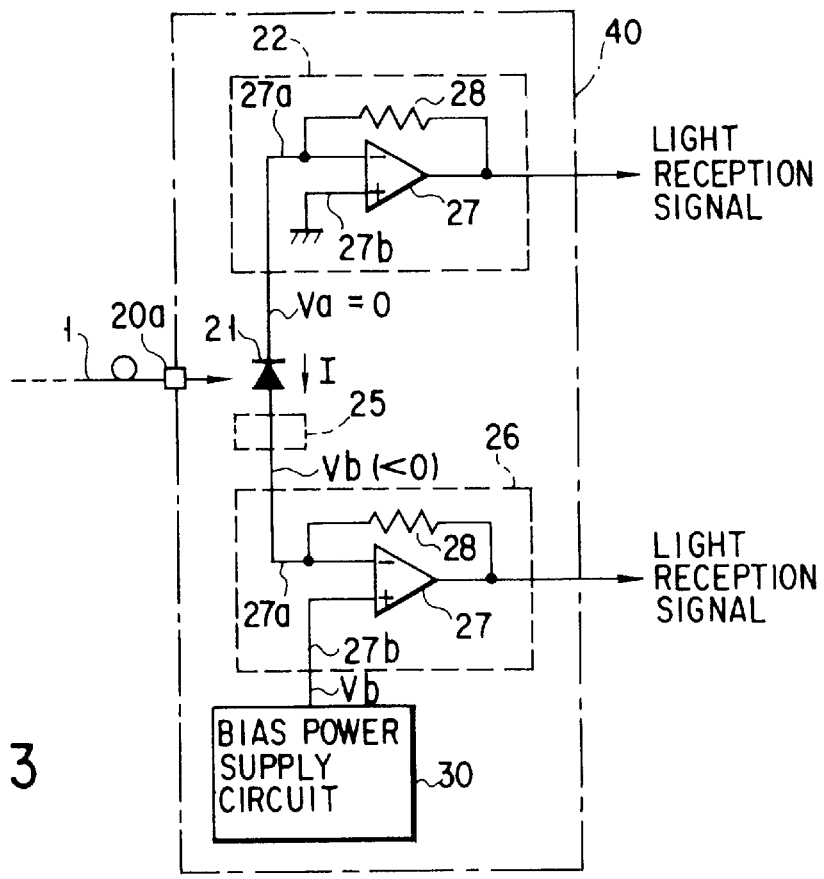
FIG. 3 is a block diagram showing the circuit arrangement of the main part of a modification of first embodiment according to the present invention.

In this case, as shown in FIG. 3, a non-inverting input terminal 27b of the operational amplifier 27 on the first DC amplifying circuit 22' side is grounded. With this arrangement, only the voltage Vb of the bias power supply circuit 30 on the second DC amplifying circuit 26 side is applied as a reverse bias voltage to the photodiode 21.

A positive bias voltage may be applied to the non-inverting input terminal 27b of the operational amplifier 27 on the first DC amplifying circuit 22' side.

In this case, the non-inverting input terminal of the operational amplifier 27 on the second DC amplifying circuit 26 side may be grounded.

The first and second DC amplifying circuits may be constituted by operational amplifiers in this manner, one of the DC amplifying circuits may output a high-speed digitally modulated signal, and the other may output an intensity signal, as in the above embodiment.

In this case, the operational amplifier capable of obtaining high-speed response characteristics is used on one side, and the DC amplifying circuit on the other side is connected to the photodiode 21 through the filter circuit 25.

Figure 4:
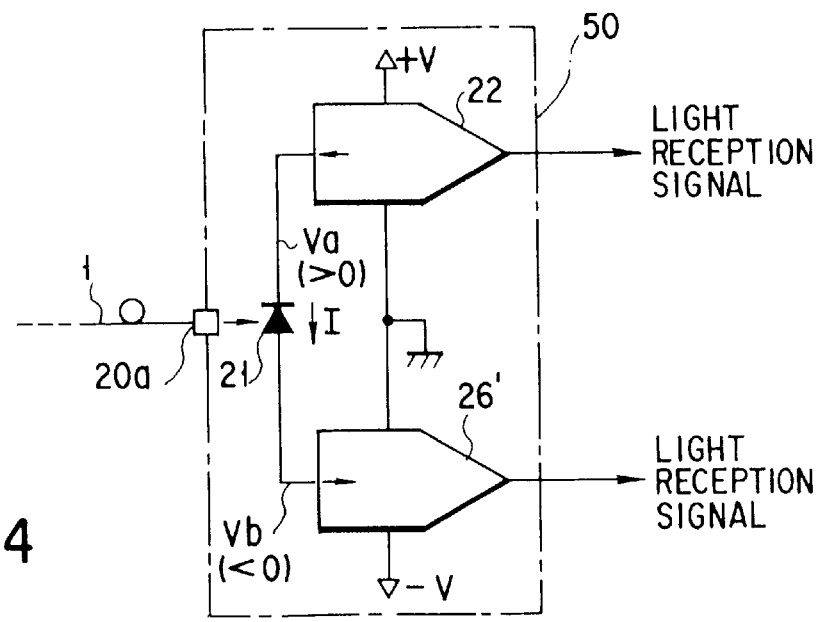
FIG. 4 is a block diagram showing the circuit arrangement of the main part of another modification of first embodiment according to the present invention.

When the light-receiving circuit simultaneously outputs only a modulated component of high-speed modulated light to two systems, this circuit may be constituted like a light-receiving circuit 50 shown in FIG. 4.

More specifically, a second DC amplifying circuit 26' in this case uses a current-suction transimpedance amplifier, and power is supplied to the second DC amplifying circuit 26' to have a negative voltage at the input terminal.

In addition, the dynamic range of an avalanche photodiode 21' (to be referred to as an APD herein-after) used as the photodiode 21 can be widened by controlling the gain of the avalanche photodiode 21' by using one of light reception signals output from the two systems, as shown in FIG. 5.

More specifically, as shown in FIG. 6, the APD 21' has characteristics in which the ratio (gain) of a light reception current to input light is higher for a higher reverse bias voltage.

A light-receiving circuit 60 in FIG. 5 positively utilizes these characteristics.

That is, a bias power supply circuit 30 of the second DC amplifying circuit 26 in FIG. 5 is constituted by a constant-voltage circuit 31 for outputting a negative reference voltage Vr, and a comparator 32 for comparing an output voltage Ve from the operational amplifier 27 with the reference voltage Vr, and outputting the comparison signal to the non-inverting input terminal 27b of the operational amplifier 27.

The light-receiving circuit 60 controls the reverse bias voltage to the APD 21' such that the output voltage Ve of the operational amplifier 27 is always equal to the reference voltage Vr.

The reverse bias voltage is desirably changed by this control within a range not to degrade the high-frequency response characteristics of the APD 21'.

With this control, the gain of the APD 21' is higher for a lower input light intensity, and lower for a higher input light intensity. The dynamic range of input light with respect to the APD can be greatly widened.

As described above, in the light-receiving circuit included in the optical signal processing apparatus as the first embodiment of the present invention, the anode of the photodiode is directly connected in a DC manner to the inverting input terminal of one of the first and second negative-feedback differential DC amplifying circuits which output voltages proportional to currents flowing through the inverting input terminals, and the cathode of the photodiode is directly connected in a DC manner to the inverting input terminal of the other DC amplifying circuit.

A bias voltage from the bias power supply circuit is applied to the non-inverting input terminal of at least one DC amplifying circuit, and the voltage of the inverting input terminal of this DC amplifying circuit is adjusted to have the same potential as that of the bias voltage. Therefore, the cathode voltage of the photodiode is set higher than the anode voltage.

For this reason, the optical signal processing apparatus according to the first embodiment can receive input light having wideband characteristics in a wide dynamic range with little loss in a low-cost arrangement, and can simultaneously output the light reception signal to two systems.

According to the optical signal processing apparatus of the first embodiment, therefore, when different measurements must be simultaneously performed by different processing methods, e.g., when the error and intensity of one optical signal are measured, one optical signal can be divided into two optical signals, which can be accurately, efficiently measured.

Next, the second embodiment of the present invention will be described with reference to the several views of the drawing.

Figure 7A:
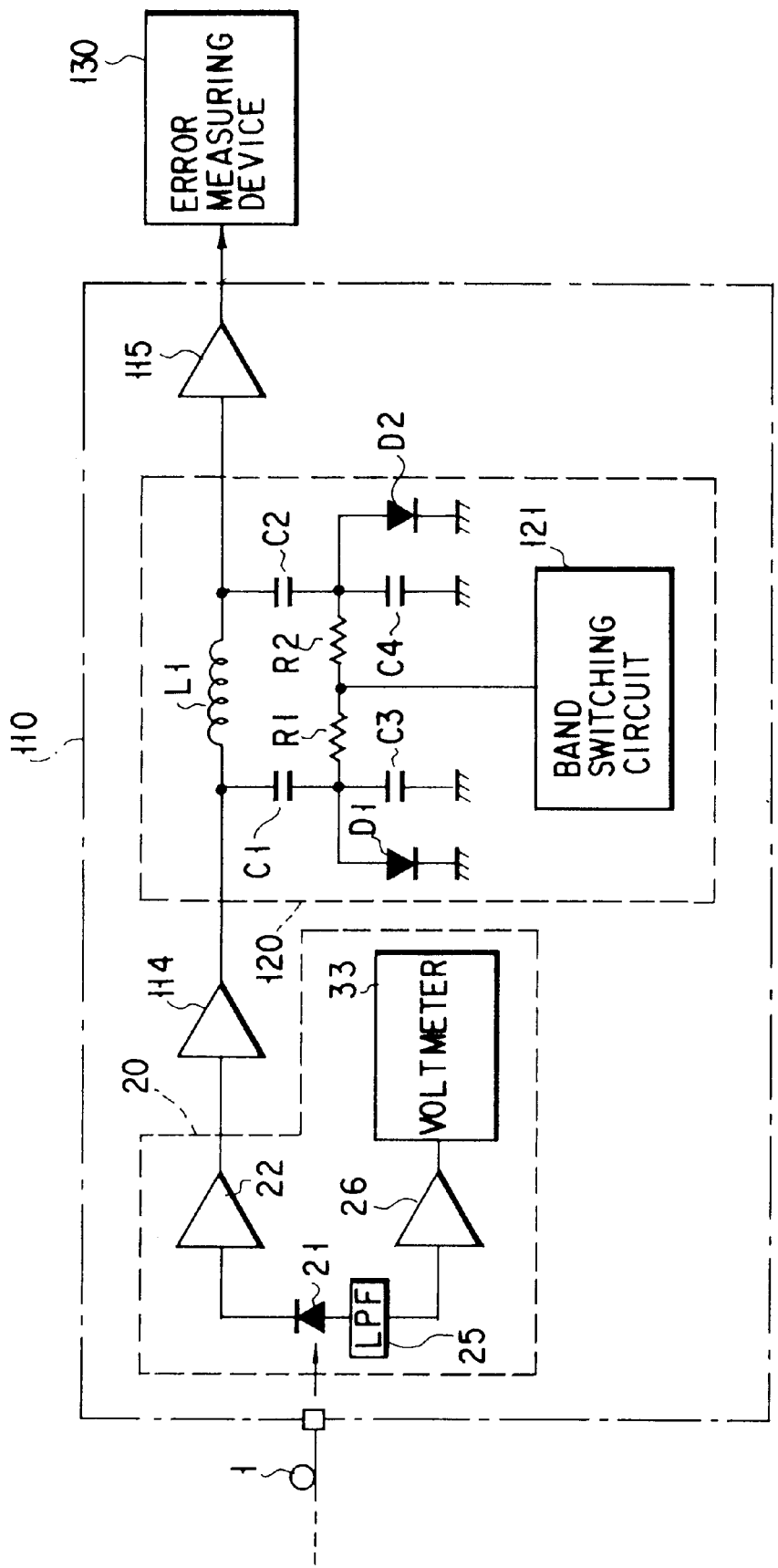
FIG. 7A is a diagram showing the arrangement of the second embodiment of the present invention.

FIG. 7A shows a light-receiving device 110 using a digital signal band limiting circuit 120 to which the second embodiment of the present invention is applied.

The light-receiving device 110 receives a high-speed digitally modulated optical signal input through an optical fiber 1, and outputs a digital signal as a modulated component to an error measuring device 130 to measure the error rate.

A light-receiving circuit 20 of the light-receiving device 110 is constituted by a photodiode 21 for receiving an optical signal, first and second DC amplifying circuits 22 and 26 serving as current-to-voltage converters each for converting a light reception current generated by the photodiode 21 upon reception of the optical signal, and amplifying and outputting the obtained voltage, a voltmeter 33 serving as a power meter (P.M), and a low-pass filter (LPF) 25.

The photodiode 21 is constituted by a PIN photodiode or an avalanche photodiode. A reverse bias voltage is stably applied to the photodiode 21 so as to receive wideband modulated light with one photodiode.

The light-receiving circuit 20 has an ability capable of receiving an optical signal digitally modulated with a signal of 622 Mbps or more.

The digital signal output from the first DC amplifying circuit 22 serving as the current-to-voltage converter is output upon two-stage amplification by first and second amplifiers 114 and 115.

The first and second amplifiers 114 and 115 have characteristics capable of amplifying a digital signal of at least 156 Mbps to 622 Mbps with a high S/N ratio.

The digital signal band limiting circuit 120 (to be referred to as the band limiting circuit 120 hereinafter) is arranged between the first and second amplifiers 114 and 115.

The band limiting circuit 120 is constituted by a coil L1 with a predetermined inductance which is inserted in series in a signal path between the amplifies 114 and 115, capacitors C1 and C2 with the same capacitance which have one-terminal sides respectively connected to the input and output terminals of the coil L1, capacitors C3 and C4 with the same capacitance which are respectively connected between the other-terminal sides of the respective capacitors C1 and C2 and ground, PIN diodes D1 and D2 respectively connected to the corresponding capacitors C3 and C4 so as to set the cathodes on the ground side, current limiting resistors R1 and R2 which have one-terminal sides respectively connected to the anode sides of the corresponding PIN diodes D1 and D2, and the other-terminal sides connected to each other, and a band switching circuit 121 for applying a predetermined positive voltage Vc or zero volt (or a negative voltage) to the other-terminal sides of the resistors R1 and R2.

The inductance of the coil L1 and the capacitances of the capacitors C1 and C2 are set to values (e.g., 100 pF) which give an optimum high-frequency cut off frequency for passing a digital signal at a bit rate of 150 Mbps.

The capacitances of the capacitors C3 and C4 are set to values (e.g., 10 pF) such that an optimum high-frequency cut off frequency for passing a digital signal of 622 Mbps which frequency is determined by the inductance of the coil L1 and the series capacitances of the capacitors C1 and C2 respectively connected in series to the capacitors C3 and C4.

Each of the PIN diodes D1 and D2 has characteristics of greatly changing a resistance value between the anode and the cathode in accordance with the amount of a forward current. The resistance value is regarded as a pure RF resistance.

When the predetermined positive voltage Vc is applied to the other-terminal sides of the resistors R1 and R2, the PIN diodes D1 and D2 are substantially short-circuited (ON state) at several Ω or less. When zero volt is applied, the PIN diodes D1 and D2 are set substantially in an open state (OFF state) at several 10K Ω or more.

The internal capacitances of the PIN diodes D1 and D2 are negligible (e.g., 0.5 pF), compared to the capacitances of the capacitors C3 and C4.

When, therefore, the predetermined positive voltage Vc is applied from the band switching circuit 121 to the resistors R1 and R2, both the PIN diodes D1 and D2 are turned on, and the capacitances between the two terminals of the coil L1 and ground become equal to the capacitances of the capacitors C1 and C2, respectively.

Accordingly, the band limiting circuit 120 has optimum high-frequency cut off characteristics for passing a digital signal at a bit rate of 150 Mbps.

When zero volt is applied, both the PIN diodes D1 and D2 are turned off, the capacitances between the two terminals of the coil L1 and ground become equal to the series capacitance of the capacitors C1 and C3 (capacitors C2 and C4).

Accordingly, the band limiting circuit 120 has optimum high-frequency cut off characteristics for passing a digital signal at a bit rate of 622 Mbps.

Note that the band switching circuit 121 switches the voltages to the resistors R1 and R2 by a manual operation of an operation unit (not shown).

The digital signal having a band limited by the band limiting circuit 120 in correspondence with the bit rate is output to the error measuring device 130 through the second amplifier 115, and subjected to error measurement.

The band limiting circuit 120 changes the band by turning on/off the PIN diodes and changing stepwise the capacitances between the two terminals of the coil L1 and ground. This circuit can be greatly downsized, compared to a case using a method of switching a plurality of independent filters with relay switches. In addition, the reliability is not degraded.

Since a digital signal passing through a signal path does not flow through the PIN diodes D1 and D2, distortion caused by nonlineality of the diodes does not occur even if the PIN diodes are in an OFF state.

In the band limiting circuit 120 shown in FIG. 7A, the cathode sides of the PIN diodes D1 and D2 are grounded. Alternatively, the PIN diodes D1 and D2 may be turned on by inverting the polarities of the PIN diodes D1 and D2 and applying a negative voltage from the band switching circuit 121.

Figure 8A:
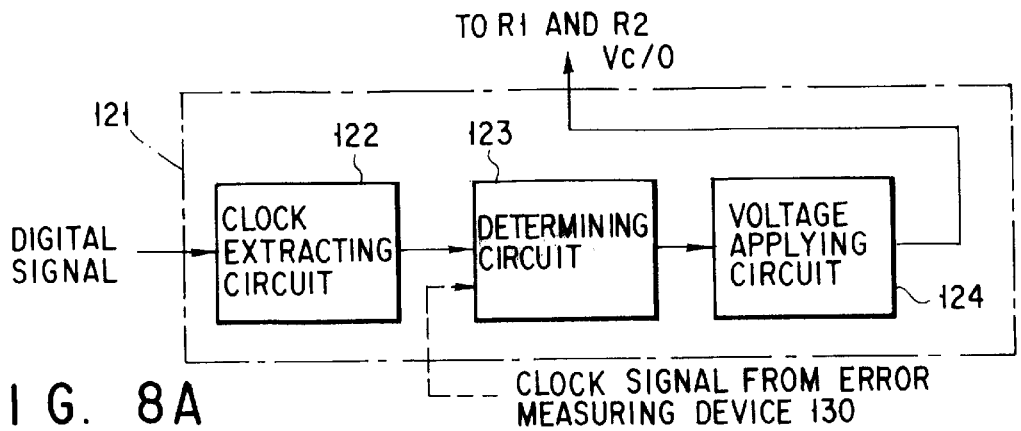
FIG. 8A is a block diagram showing the arrangement of the main part of the second embodiment of the present invention.

By constituting the band switching circuit 121 like the one shown in FIG. 8A, the band of the filter can be automatically switched in accordance with the bit rate of an input digital signal.

More specifically, as shown in FIG. 8A, a clock extracting circuit 122 extracts clock component of the digital signal from an output from the first or second amplifier 114 or 115.

A determining circuit 123 determines whether the frequency of the extracted clock signal is 156 MHz or 622 MHz.

When the frequency is 156 MHz, the predetermined voltage Vc is applied from a voltage applying circuit 124 to the resistors R1 and R2.

When the frequency is 622 MHz, zero volt (or a predetermined negative voltage) is applied from the voltage applying circuit 124 to the resistors R1 and R2.

When the error measuring device 130 having a clock extracting function is internally connected, the clock extracting function of the error measuring device 130 may be used instead of the clock extracting circuit 122, and a clock signal extracted by the error measuring device 130 may be input to the determining circuit 123.

Figures 7B, 8B:
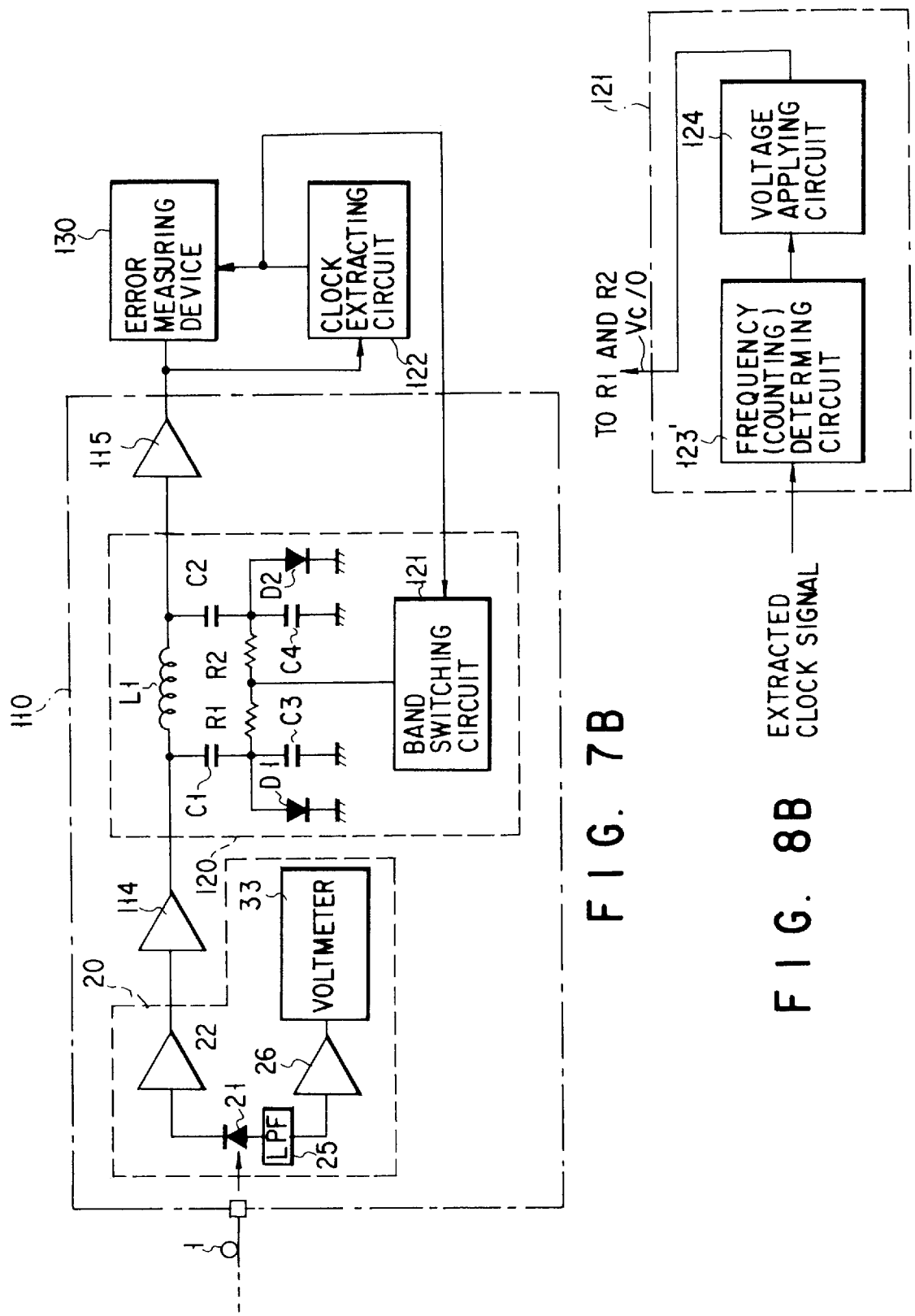
FIG. 7B is a diagram showing the modifying arrangement of the second embodiment of the present invention.
FIG. 8B is a diagram showing the modifying arrangement of the main part of the second embodiment of the present invention.

FIG. 7B shows the modifying arrangement of the second embodiment as shown in FIG. 7A. More specifically, as shown in FIG. 7B, a clock extracting circuit 122 extracts clock component of the digital signal from an output from the second amplifier 115.

A extracted clock signal is applied to the band switching circuit 121.

A frequency (counting) determining circuit 123' in the band switching circuit 121 determines whether the frequency of the extracted clock signal is 156 MHz or 622 MHz, as shown in FIG. 8B.

When the frequency is 156 MHz, the predetermined voltage Vc is applied from a voltage applying circuit 124 to the resistors R1 and R2.

When the frequency is 622 MHz, zero volt (or a predetermined negative voltage) is applied from the voltage applying circuit 124 to the resistors R1 and R2.

In the above embodiment, the band is limited in correspondence with digital signals of 156 Mbps and 622 Mbps.

Figure 9:
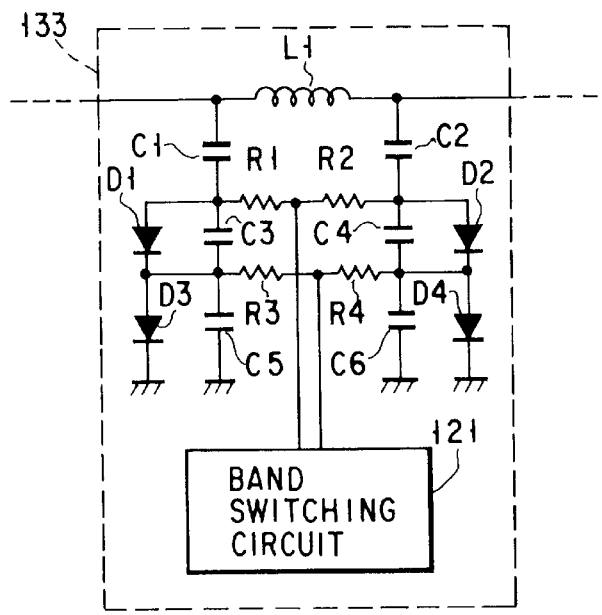
FIG. 9 is a diagram showing a modification of the second embodiment of the present invention.

To limit the band in accordance with digital signals of 52 Mbps, 156 Mbps, and 622 Mbps, a band limiting circuit 133 shown in FIG. 9 is used.

In the band limiting circuit 133 of FIG. 9, capacitors C5 and C6 with the same capacitance are inserted in series between the capacitors C3 and C4 and ground.

PIN diodes D3 and D4 are connected parallel to the respective capacitors C5 and C6 in a forward direction with respect to the PIN diodes D1 and D2.

That is, the band limiting circuit 133 is constituted to flow a current from the anode sides of the respective PIN diodes D3 and D4 through resistors R3 and R4.

In the case of the band limiting circuit 133, the capacitances of the capacitors C1 and C2 are set such that the high-frequency cut off frequency of the filter constituted by the coil L and the capacitors C1 and C2 has an optimum value for passing a digital signal at a bit rate of 52 Mbps.

The capacitances of the capacitors C3 and C4 are set such that the high-frequency cut off frequency of the filter formed by the series capacitors C1 and C2 and the coil L has an optimum value for passing a digital signal at a bit rate of 156 Mbps.

The capacitances of the capacitors C5 and C6 are set such that the high-frequency cut off frequency of the filter formed by the series capacitors C1, C2, C3, and C4 and the coil L has an optimum value for passing a digital signal at a bit rate of 622 Mbps.

When a digital signal at a bit rate of 52 Mbps is input, the band switching circuit 121 applies a predetermined positive voltage to the resistors R1 and R2 to turn on all the PIN diodes D1 to D4.

When a digital signal at a bit rate of 156 Mbps is input, the band switching circuit 121 applies a predetermined positive voltage to the resistors R3 and R4 to turn on the PIN diodes D3 and D4, while keeping the PIN diodes D1 and D2 off.

When a digital signal at a bit rate of 622 Mbps is input, the band switching circuit 121 applies zero volt (or a predetermined negative voltage) to the resistors R1 and R2 to turn off all the PIN diodes D1 to D4.

In the band limiting circuit 133, the PIN diodes D1 and D3, and the PIN diodes D2 and D4 are connected in series in a forward direction to reduce the influence of the capacitances of the diodes in an OFF state.

To reduce the influence of the PIN diodes on the ON resistance in the band limiting circuit 133, the cathode sides of the PIN diodes D1 and D2 may be directly connected to ground.

In the above embodiments, a plurality of capacitors are directly connected between the coil and ground, and the capacitances are changed stepwise by turning on/off the PIN diodes between the connecting points or the PIN diodes between the connecting points and ground, thereby switching the band.

Figure 10:
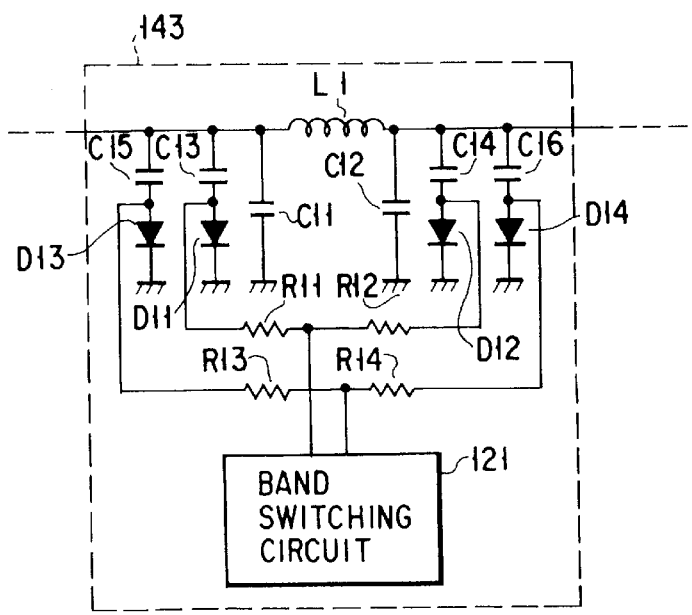
FIG. 10 is a diagram showing another modification of the second embodiment of the present invention.

Alternatively, like a band limiting circuit 143 shown in FIG. 10, PIN diodes D11 to D14 may be used to connect a plurality of capacitors C11 to C16 parallel between the two terminals of the coil L1 and ground.

In the case of the band limiting circuit 143, the capacitances of the capacitors C11 and C12 connected between the two terminals of the coil L1 and ground are set in advance to give a high-frequency cut off frequency corresponding to a digital signal at a bit rate of 622 Mbps.

The parallel capacitance of the capacitors C11 and C13 (capacitors C12 and C14) is set in advance to give a high-frequency cut off frequency corresponding to a digital signal at a bit rate of 156 Mbps.

Further, the parallel capacitance of the capacitors C11 and C15 (capacitors C12 and C16; the capacitors C13 and C14 may be included) is set in advance to give a high-frequency cut off frequency corresponding to a digital signal at a bit rate of 52 Mbps.

If the band switching circuit 121 flows a current through resistors R11 and R12 to the PIN diodes D11 and D12 connected in series with the capacitors C13 and C14, the band limiting circuit 143 has an optimum band for passing a digital signal of 156 Mbps.

If the band switching circuit 121 flows a current through resistors R13 and R14 to the PIN diodes D13 and D14 connected in series with the capacitors C15 and C16, the band limiting circuit 143 has an optimum band for passing a digital signal of 52 Mbps.

Further, if all the PIN diodes D11 to D14 are turned off, the band limiting circuit 143 has an optimum band for passing a digital signal of 622 Mbps.

Each embodiment employs the band limiting circuit of $\pi$ type in which the capacitors are arranged on the input and output sides of the coil L1.

However, a plurality of capacitors may be arranged on either the input or output side of the coil, and PIN diodes may be connected to the capacitors to change the capacitances stepwise.

In addition, a band limiting circuit of a T type may be constituted by connecting two coils in series and arranging a plurality of capacitors between the connecting points and ground, and PIN diodes may be connected to the capacitors to change the capacitances stepwise.

Further, filters of the $\pi$ type, like the one in the above embodiment, may be connected in many stages.

As described above, in the digital signal band limiting circuit included in the optical signal processing apparatus as the second embodiment of the present invention, the PIN diode is connected to at least one of the plurality of capacitors arranged between ground and at least one terminal of the coil connected in series with the signal path of a digital signal.

By turning on/off the PIN diode by the band switching circuit, the capacitance between at least one terminal of the coil and ground is changed stepwise to switch the pass band in correspondence with each bit rate.

According to this digital signal band limiting circuit, therefore, the bands of digital signals at different bit rates can be limited without degrading the reliability and causing distortion. The circuit itself can be greatly downsized.

Next, the third embodiment of the present invention will be described with reference to the several views of the drawing.

Figures 11, 12:
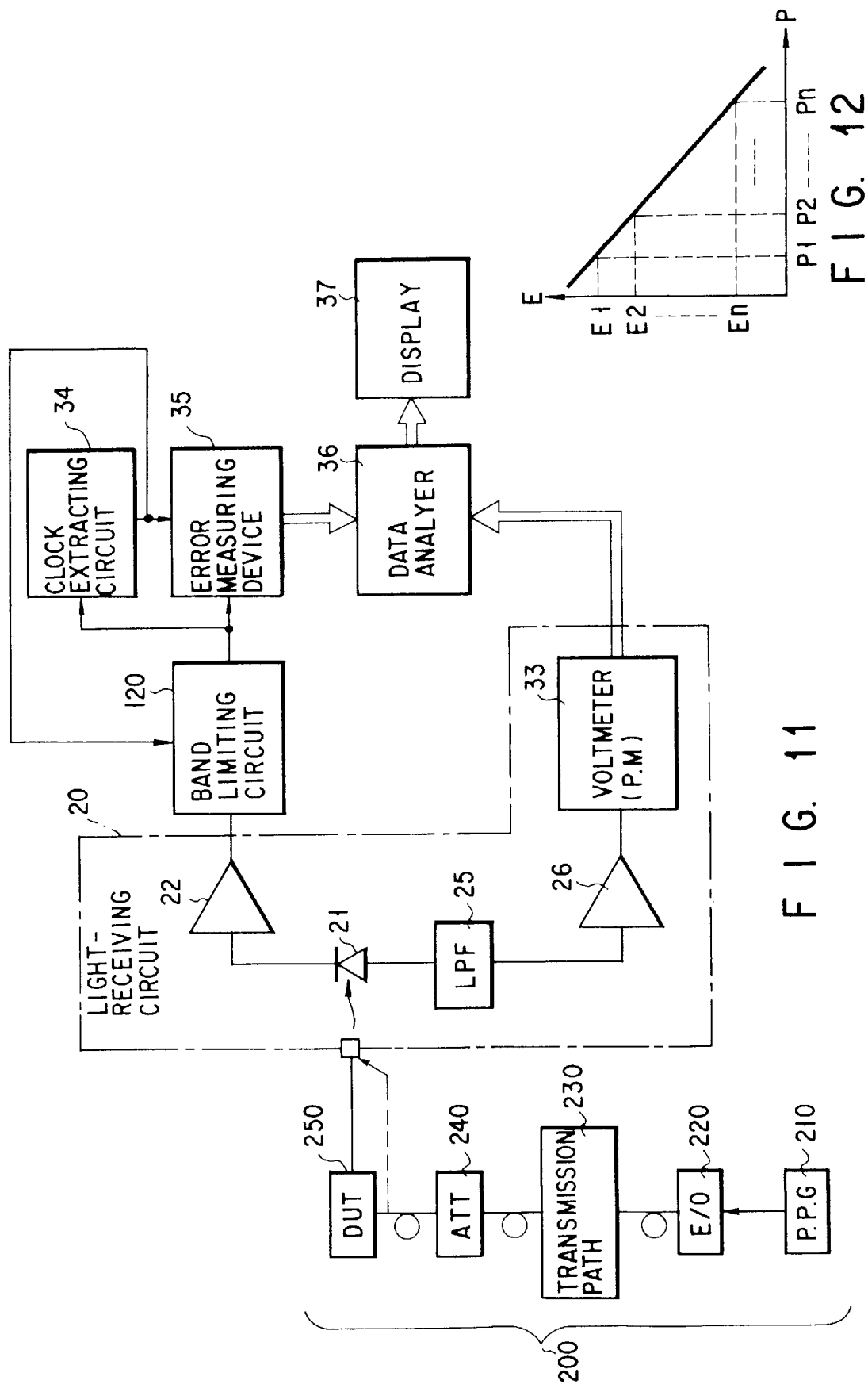
FIG. 11 is a block diagram showing the circuit arrangement of the third embodiment of the present invention.
FIG. 12 a graph showing a display example according to the third embodiment of the present invention.
Figure 13:
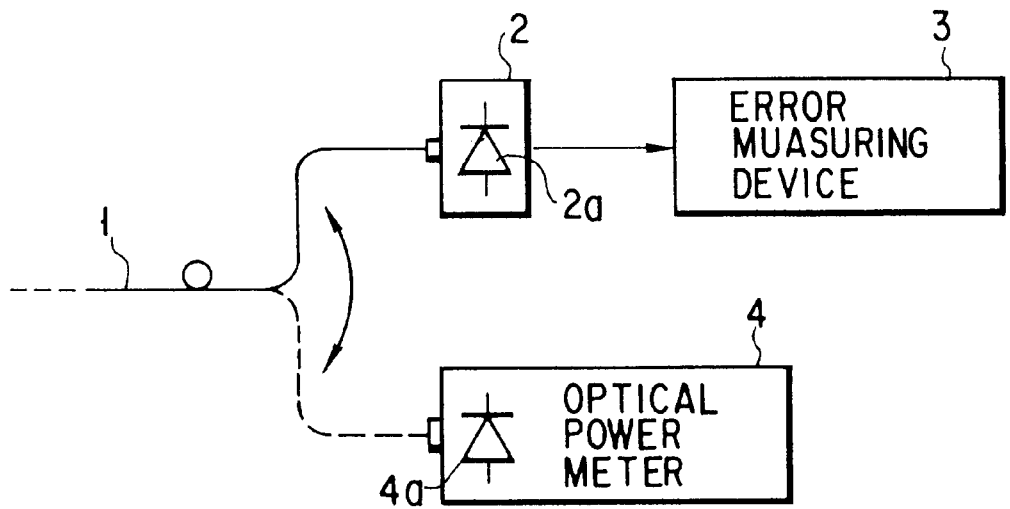
FIG. 13 is a view showing a measuring system using a conventional light-receiving circuit.
Figure 14:
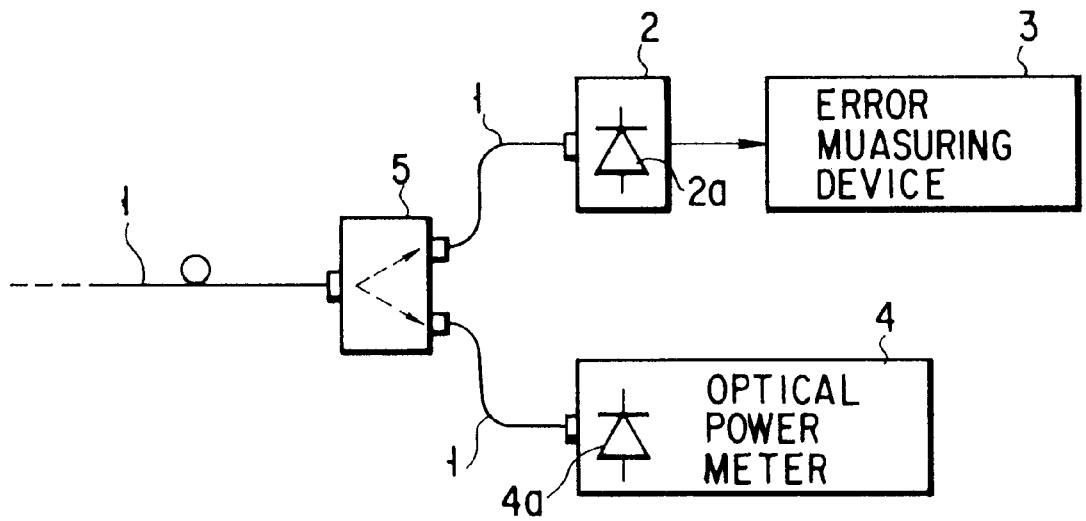
FIG. 14 is a view showing another measuring system using a conventional light-receiving circuit.

FIG. 11 is a block diagram showing the circuit arrangement of the third embodiment of the present invention.

The third embodiment employs the light-receiving circuit 20 according to the first embodiment described above, and the band limiting circuit 120 according to the second embodiment arranged, as needed. At the same time, the third embodiment can clearly display the correlation between the intensity of an optical signal and the error rate.

More specifically, only the main parts of the light-receiving circuit 20 and the band limiting circuit 120 are respectively extracted from FIGS. 1 and 7A or 7B, as shown in FIG. 11.

An output from a first current amplifying circuit 22 of the light-receiving circuit 20 is supplied to a clock extracting circuit 34 and an error measuring device 35 through a band limiting circuit 120.

Note that an output from the clock extracting circuit 34 is supplied to the error measuring device 35. However, if the error measuring device 130 has a clock extracting function as described in the second embodiment, the clock extracting circuit 34 can be omitted.

Outputs from the error measuring device 35 and a voltmeter 33 serving as a power meter (P.M) are transferred to a data analyzer 36, and used for a predetermined analysis required to calculate the correlation between the intensity of an optical signal and the error rate.

An output from the data analyzer 36 is supplied to a display 37.

The display 37 displays, e.g., the correlation between an intensity P (P1, P2, . . . , Pn) of an optical signal and an error rate E (E1, E2, . . . , En), as shown in FIG. 12 (to be described later).

In FIG. 11, a measuring system 200 is coupled to the input portion of the light-receiving circuit 20.

More specifically, the measuring system 200 comprises an optical (signal) pulse generator (P.P.G) 210, an electro-optical converter (E/O) 220 for converting an optical (signal) pulse from the P.P.G 210 into an optical signal, a transmission path 230 such as a fiber which transmits the optical signal from the E/O 220, an optical attenuator (ATT) 240 arranged at the end portion of the transmission path 230, and a target measuring device (DUT) 250 coupled between the ATT 240 and the input portion of the light-receiving circuit 20.

Next, an operation of clearly displaying the correlation between the intensity of the optical signal and the error rate by the measuring system 200 in the above arrangement will be described.

First, the input portion of the light-receiving circuit 20 is coupled to not the DUT 250 but the output of the ATT 240, as indicated by a broken line in FIG. 11.

In this state, the operator sets the intensity value on the display 37 to a desired value P1 by operating the ATT 240, while referring to the intensity value on the display 37.

The data analyzer 36 receives the first intensity value P1. However, in this state, the data analyzer 36 is inhibited from receiving an output from the error measuring device 35.

Next, the input portion of the light-receiving circuit 20 is coupled to the output of the DUT 250, as indicated by a solid line in FIG. 11.

In this state, the data analyzer 36 receives the first error rate E1 as an error measurement result with respect to the DUT 250 from the error measuring device 35. However, in this state, the data analyzer 36 is inhibited from receiving an output from the voltmeter 33.

Subsequently, the data analyzer 36 sequentially receives the second to nth light intensity values P2 to Pn and the second to nth error rates E2 to En of the DUT 250 corresponding to P2 to Pn in the above-described manner.

The display 37 displays at once or sequentially the first to nth light intensity values P1 to Pn and the first to nth error rates E1 to En of the DUT 250 corresponding to the light intensity values P1 to Pn which are received by the data analyzer 36 in the above manner, as, e.g., an error rate curve in a shape as shown in FIG. 12.

With this processing, the correlation between the light intensity value and the error rate in the DUT 250 can be clearly displayed.

Note that, in the above embodiment, the light intensity and the error rate can be received in an arbitrary order, and received in an order to facilitate measurement.

The band limiting circuit 120 in this embodiment has the same function as that in the second embodiment. The above-described correlation between the light intensity value and the error rate is finally displayed at a bit rate corresponding to switching of the band of the band limiting circuit 120.

The third embodiment comprises the data processing circuit of processing the correlation between the intensity of an optical signal and the error rate, in addition to the light-receiving circuit according to the first embodiment, and the band limiting circuit according to the second embodiment arranged, as needed. With this arrangement, applicability of the optical signal processing apparatus can be greatly improved.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. An optical signal processing apparatus comprising:
   an optical signal introducing portion for introducing an optical signal to be processed;
   a light-receiving circuit for converting the optical signal to be processed which is introduced from said optical signal introducing portion, into a main signal for measuring an error rate, and an auxiliary signal for measuring optical power, and outputting the main signal and the auxiliary signal;
   optical power measuring means for measuring optical power of the optical signal to be processed on the basis of the auxiliary signal for measuring optical power which is output from said light-receiving circuit;
   error rate measuring means for measuring an error rate of the optical signal to be processed on the basis of the main signal for measuring an error rate which is output from said light-receiving circuit, and a clock signal included in the main signal; and
   data analyzing means for performing, on the basis of optical power measurement data from said optical power measuring means and error rate measurement data from said error rate measuring means, a correlation analysis of the two data.

2. An apparatus according to claim 1, wherein said light-receiving circuit comprises:
   a) first and second negative-feedback differential DC amplifying circuits each of which has an inverting input terminal, a non-inverting input terminal, and an output terminal, and wherein outputs from said output terminal are a voltage proportional to a current flowing through said inverting input terminal;
   b) a photodiode having an anode, a cathode, and a light input portion, said anode being directly connected in a DC manner to said inverting input terminal of one DC amplifying circuit of said first and second DC amplifying circuits, said cathode being directly connected in a DC manner to said inverting input terminal of the other DC amplifying circuit, and said photodiode flowing from said anode to said cathode a light reception current corresponding to the optical signal to be processed which is input to said light input portion; and
   c) a bias power supply circuit for applying a bias voltage to said non-inverting input terminal of at least one DC amplifying circuit of said first and second DC amplifying circuits so as to set a potential of said cathode of said photodiode higher than a potential of said anode, and
   wherein the main and auxiliary signals corresponding to the optical signal to be processed are output from said respective output terminals of said first and second DC amplifying circuits.

3. An apparatus according to claim 2, wherein said bias power supply circuit includes first and second bias power supply circuits for applying first and second bias voltages corresponding to the bias voltage to said respective non-inverting input terminals of said first and second DC amplifying circuits.

4. An apparatus according to claim 2, wherein said light-receiving circuit further comprises:
   an optical power meter which is connected to said output terminal of either one of said first and second DC amplifying circuits, and instructs a level corresponding to power of the optical signal to be processed on the basis of an electrical signal output from said output terminal.

5. An apparatus according to claim 4, wherein said light-receiving circuit further comprises:
   a capacitor-input low-pass filter which is constituted by a capacitor and a coil connected between said anode or cathode of said photodiode and said inverting input terminal of one of said first and second DC amplifying circuits which has said output terminal connected to said optical power meter, and allows to pass a low-frequency component of the light reception current flowing from said photodiode.

6. An apparatus according to claim 4, wherein said optical power meter includes range switching means for switching feedback resistors of said DC amplifying circuit connected to said power meter.

7. An apparatus according to claim 4, further comprising:
   an error measuring device connected to said output terminal of said other one of said first and second DC amplifying circuits to measure an error rate of an electrical signal output from said output terminal on the basis of a clock signal included in the electrical signal.

8. An apparatus according to claim 2, wherein one of said first and second DC amplifying circuits which is connected to said cathode of said photodiode includes a current-sweep out transimpedance amplifier, and the other DC amplifying circuit connected to said anode of said photodiode includes an operational amplifier.

9. An apparatus according to claim 2, wherein each of said first and second DC amplifying circuits includes an operational amplifier and a feedback resistor.

10. An apparatus according to claim 2, wherein said first and second DC amplifying circuits include current-sweep out and current-pumping transimpedance amplifiers, respectively.

11. An apparatus according to claim 2, wherein said photodiode includes an avalanche photodiode, and said bias power supply circuit includes means for controlling the bias voltage so as to set an output voltage of at least one of said first and second current amplifying circuits to be equal to a predetermined reference voltage.

12. An apparatus according to claim 1, further comprising:
   display means for displaying a correlation analysis result of the two data from said data analyzing means.

13. An apparatus according to claim 1, further comprising:
   a band limiting circuit coupled between said light-receiving circuit and said error rate measuring means, and which limits a band of the main signal for measuring an error rate to a band matching with a predetermined bit rate corresponding to the optical signal to be processed.

14. An apparatus according to claim 13, wherein said band limiting circuit comprises:
   a coil connected in series with an output path of the digital signal;
   a plurality of capacitors arranged between at least one terminal of said coil and a reference potential point;
   a PIN diode connected between at least one of said plurality of capacitors and the reference potential point; and a band switching circuit which selectively flows a current to said PIN diode in accordance with the bit rate of the digital signal to switch said PIN diode from an OFF state to an ON state, thereby changing stepwise a capacitance between at least one terminal of said coil and the reference potential point in accordance with the bit rate of the digital signal.

15. An apparatus according to claim 14, wherein said light-receiving circuit comprises:

a) first and second negative-feedback differential DC amplifying circuits each of which has an inverting input terminal, a non-inverting input terminal, and an output terminal, and outputs from said output terminal a voltage proportional to a current flowing through said inverting input terminal;

b) a photodiode having an anode, a cathode, and a light input portion, said anode being directly connected in a DC manner to said inverting input terminal of one DC amplifying circuit of said first and second DC amplifying circuits, said cathode being directly connected in a DC manner to said inverting input terminal of the other DC amplifying circuit, and said photodiode flowing from said anode to said cathode a light reception current corresponding to the optical signal to be processed which is input to said light input portion; and c) a bias power supply circuit for applying a bias voltage to said non-inverting input terminal of at least one DC amplifying circuit of said first and second DC amplifying circuits so as to set a potential of said cathode of said photodiode higher than a potential of said anode, wherein the digital signal and the electrical signal corresponding to the optical signal to be processed are output from said respective output terminals of said first and second DC amplifying circuits.

16. An apparatus according to claim 15, wherein said light-receiving circuit further comprises:

an optical power meter connected to said output terminal of one of said first and second DC amplifying circuits which outputs the electrical signal, said optical power meter instructing a level corresponding to power of the optical signal to be processed on the basis of the electrical signal output from said output terminal.

17. An apparatus according to claim 14, wherein said digital signal band limiting circuit includes:

first and second capacitors connected in series between one terminal of said coil and the reference potential point;

third and fourth capacitors connected in series between the other terminal of said coil and the reference potential point;

first and second PIN diodes respectively connected between said second and fourth capacitors and the reference potential point; and first and second resistors connected in series between a connecting point of said first and second capacitors and a connecting point of said third and fourth capacitors, and said band switching circuit includes, at a connecting point of said first and second resistors, means for applying a predetermined voltage to selectively turn on/off said first and second PIN diodes in accordance with the bit rate of the digital signal.

18. An apparatus according to claim 14, wherein said band switching circuit includes:

a determining circuit for determining a frequency of a clock signal on the basis of a clock component of the digital signal; and a voltage applying circuit for applying a predetermined voltage to said PIN diode to selectively turn on/off said PIN diode in accordance with a determination result of said determining circuit.

19. An apparatus according to claim 14, wherein said digital signal band limiting circuit includes:

first, second, and third capacitors connected in series between one terminal of said coil and the reference potential point;

fourth, fifth, and sixth capacitors connected in series between the other terminal of said coil and the reference potential point;

first, second, third, and fourth PIN diodes respectively connected parallel to said second, third, fifth, and sixth capacitors;

first and second resistors connected in series between a connecting point of said first and second capacitors and a connecting point of said fourth and fifth capacitors; and third and fourth resistors connected in series between a connecting point of said second and third capacitors and a connecting point of said fifth and sixth capacitors, and said band switching circuit includes means for selectively applying first and second predetermined voltages to a connecting point of said first and second resistors and a connecting point of said third and fourth resistors to selectively turn on/off said first, second, third, and fourth PIN diodes in accordance with the bit rate of the digital signal.

20. An apparatus according to claim 14, wherein said digital signal band limiting circuit includes:

first and second capacitors respectively connected between one terminal and the other terminal of said coil and the reference potential point;

a third capacitor and a first PIN diode, and a fourth capacitor and a second PIN diode which are respectively connected in series between said one terminal of said coil and the reference potential point;

a fifth capacitor and a third PIN diode, and a sixth capacitor and a fourth PIN diode which are respectively connected in series between said other terminal of said coil and the reference potential point;

first and second resistors connected in series between a connecting point of said third capacitor and said first PIN diode and a connecting point of said fifth capacitor and said third PIN diode; and third and fourth resistors connected in series between a connecting point of said fourth capacitor and said second PIN diode and a connecting point of said sixth capacitor and said fourth PIN diode, and said band switching circuit includes means for selectively applying first and second predetermined voltages to a connecting point of said first and second resistors and a connecting point of said third and fourth resistors to selectively turn on/off said first, second, third, and fourth PIN diodes in accordance with the bit rate of the digital signal.

21. An apparatus according to claim 14, further comprising:

an error measuring device which is connected to an output terminal of said digital signal band limiting circuit, and measures an error rate of the digital signal having the limited band and output from said output terminal on the basis of a clock signal included in the digital signal.

* * * * *